United States Patent Office 3,594,368
Patented July 20, 1971

3,594,368
PREPARATION OF N,N'-DIBENZYLETHYLENE-DIAMINE BIS D(—) - α - AMINOBENZYLPENI-CILLIN TRIHYDRATE
John H. Sellstedt, St. Davids, Delaware, Richard Bogash, Philadelphia, and Joseph P. Hou, Butler Pike, Conshohocken, Pa., assignors to American Home Products Corporation, New York, N.Y.
No Drawing. Filed June 11, 1969, Ser. No. 832,463
Int. Cl. C07d 99/16
U.S. Cl. 260—239.1
5 Claims

ABSTRACT OF THE DISCLOSURE

This invention concerns a process for the preparation of crystalline N,N'-dibenzylethylenediamine bis [D(—)-α-aminobenzylpenicillin]trihydrate of high purity and potency having an average particle size in the range of about two to about thirty microns which is useful in the preparation of pharmaceutically elegant antibiotic dosage forms.

---

This invention relates to a new and novel form of N,N'-dibenzylethylenediamine bis[D(—)-α-aminobenzylpenicillin]trihydrate. In particular, it is concerned with a process for the preparation of high potency and high purity N,N'-dibenzylethylenediamine bis [D(—)-α-aminobenzylpenicillin]trihydrate which has a tabular crystalline form with an average particle size of about two to about thirty microns. This material is, therefore, useful in the preparation of pharmaceutically elegant dosage forms.

The new and novel process of the present invention for the preparation of high purity and high potency crystalline N,N'-dibenzylethylenediamine bis[D(—)-α-aminobenzylpenicillin]trihydrate which has an average particle size between about two and about thirty microns comprises: dissolving about one part of equimolar amounts of D(—)-α-aminobenzylpenicillin and triethylamine in about 1.4 to about 1.8 parts, preferably about 1.65 parts of a miscible mixture of water and from about six to about eight percent ethyl acetate e.g. preferably water saturated with ethyl acetate, to afford a clear, dark yellow solution which is then slowly admixed, e.g. preferably over a period of about fifteen minutes to one and a half hours, at a temperature below about 10° C. with about double the volume of a solution comprised of a miscible mixture of water and from about six to about eight percent ethyl acetate, e.g. preferably water saturated with ethyl acetate, and an amount of an acid salt of dibenzylethylenediamine, e.g. preferably the diacetate, which is about one-half the molar amount of D(—)-α-aminobenzylpenicillin employed, preferably up to about a ten percent excess of the dibenzylethylenediamine acid salt is used to maintain the pH of the penicillin reaction mixture stable.

When the reaction is complete, the resulting N,N'-dibenzylethylenediamine bis[D(—)-α-aminobenzylpenicillin]trihydrate is separated by standard recovery procedures. For example, the precipitated product is filtered, washed with water, and dried. A particularly effective method of separating this product involves the following: (a) storing the reaction mixture at about 5° C. for a period of about eight to twelve hours, (b) filtering said mixture and water washing the collected solid; (c) resuspending the collected solid in water; and (d) filtering the resulting suspension, and water washing and then drying the collected product.

The N,N' - dibenzylethylenediamine bis[D(—)-α-aminobenzylpenicillin]trihydrate prepared by the above-described process has a purity and potency between about ninety-five and one hundred percent of theory. Further, this product is in the form of tabular crystals which have average particle size between about 2 and 30 microns.

The starting materials employed in the above-described process are all commercially available or are readily prepared by procedures well known in the chemical art. As employed herein the term "acid salt of dibenzylethylenediamine" is meant to include those salts that are formed with any acceptable acids. Such acids are well known in the art, for example, hydrochloric, hydrobromic, sulfuric, nitric, salicyclic, acetic, benzenesulfonic, toluenesulfonic, methylsulfonic, ethylsulfonic acids and the like. These salts may be prepared by procedures commonly employed in the art, for example, reacting N,N'-dibenzylethylenediamine with the selected acid in suitable solution, e.g. water and then concentrating the solution. The new and novel high purity and potency N,N'-dibenzylethylenediamine bis[D(—)-α-aminobenzylpenicillin]trihydrate of the present invention in standard and accepted tests have exhibited activity against gram-positive and gram-negative bacteria. In this regard, this material is, therefore, of value as antibacterial agent.

The problem encountered in the preparation of N,N'-dibenzylethylenediamine bis[D(—)-α-aminobenzylpenicillin]trihydrate by prior are methods is the inability to prepare a suitable crystalline material that could be successfully suspended in a liquid vehicle, particularly avoiding high viscosities, and the development of a composition that would not have a tendency to cause blockage of a hypodermic needle.

It has been noted that, regardless of the prior art method employed, to prepare N,N'-dibenzylethylenediamine bis[D(—)-α-aminobenzylpenicillin]trihydrate the product is always obtained largely as long, needle-like crystals either as single needles, rosettes or dentrites. Attempts to use such long, needle-like crystalline material in parenteral compositions invariably results in a tendency toward blockage of the hypodermic needle of 22 gauge (Stubbs), or even of the larger 20 gauge needle. Alternatively, the crystalline N,N'-dibenzylethylenediamine bis[D(—) - α - aminobenzylpenicillin]trihydrate prepared by the process of the present invention is tabular in form and has an average crystalline particle size of between 2 and 30 microns which makes it very well suited for use in these parenteral compositions. When prepared as parenteral compositions, the N,N'-dibenzylethylenediamine bis[D(—) - α - aminobenzylpenicillin]trihydrate of the present invention, because of its crystalline shape and particle size, will not be excessively viscous and will readily pass through a 22 to 20 gauge hypodermic needle without blockage.

The following examples are given by way of illustration:

EXAMPLE I

Suspend D(—)-α-aminobenzylpenicillin (23.5 g., 0.067 mole) in 50 ml. of cold water saturated with ethyl acetate in a well stirred, cold water (7° C.) jacketed vessel and add triethylamine (6.8 g., 0.067 mole) to afford a dark yellow, clear solution which is then filtered. Dibenzylethylenediamine diacetate (13.3 g., 0.037 mole) is dissolved in 100 ml. of cold water saturated with ethyl acetate. The resulting solution is filtered and then slowly added (about twenty minutes) into the above-prepared D(—)-α-aminobenzylpenicillin solution in a cold water jacketed vessel and the reaction is allowed to continue for another thirty minutes. The crystalline precipitate is then filtered and dried at room temperature for twenty-four hours to afford N,N'-dibenzylethylenediamine bis-[D(—) - α - aminobenzylpenicillin]trihydrate, (32 g., 89.2% yield), M.P. 160–2° C. (decomp.).

Analysis.—For $C_{48}H_{58}N_8O_{11}S_2 \cdot 3H_2O$ (percent): C, 58; H, 6.5; N, 11.28. Found (percent): C, 56.7; H, 6.03; N, 11.15.

The above-prepared penicillin product has an infrared peak at $5.63\mu$; Karl Fischer water analyses of 7.29% and 5.8%; a purity and potency which is 96% of theory, and has a crystalline structure which is substantially tabular in form with an average particle size of about 2 to about 25 microns when measured by the photomicrographic procedure.

EXAMPLE II

Suspend D(—)-α-aminobenzylpenicillin (47 g., 0.135 mole) in 100 ml. of cold water saturated with ethyl acetate in a well stirred, cold water (about 7° C.) jacketed vessel and add triethylamine (13.6 g., 0.135 mole) to produce a clear, dark yellow solution having a pH of about 8–9 which is then filtered. Dibenzylethylenediamine diacetate (26.6 g., 0.074 mole) is dissolved in about 180 ml. of water saturated with ethyl acetate and then filtered.

The dibenzylethylenediamine diacetate solution is added from a dropping funnel over a period of a half hour to the D(—)-α-aminobenzylpenicillin solution in a stirred and cold water jacketed vessel. Thereafter, the reaction is allowed to continue for about an additional half hour to afford a thick crystalline precipitate. The reaction mixture is placed in a cold room (about 5° C.) for about twelve hours, then filtered, washed twice with water, and dried at room temperature for twenty-four hours to yield N,N'-dibenzylethylenediamine bis[D(—)-α-aminobenzylpenicillin]trihydrate, (60 g., 90% yield), M.P. 161–2° C. (decomp.).

Analysis.—For $C_{48}H_{58}N_8O_{11}S_2 \cdot 3H_2O$ (percent): C, 58.0; H, 6.5; N, 11.28. Found (percent): C, 56.6; H, 6.0; N, 11.14.

The above-prepared penicillin product has an infrared peak at $5.63\mu$; Karl Fischer water analyses of 6% and 5.9%; a purity and potency which is 96% of theory; and has a crystalline structure which is substantially tabular in form with an average particle size of about 2 to about 15 microns when measured by the photomicrographic procedure.

The above reaction was repeated using water containing about six percent ethyl acetate as the solvent to afford N,N'-dibenzylethylenediamine bis[D(—) - α - aminobenzylpenicillin]trihydrate with similar properties.

EXAMPLE III

Suspend D(—)-α-aminobenzylpenicillin (47 g., 0.135 mole) in 100 ml. of cold water saturated with ethyl acetate in a well stirred, cold water jacketed vessel and add triethylamine (13.6 g., 0.135 mole) to produce a dark yellow solution having a pH of about 8 to 9. This solution is filtered and then slowly added to 200 ml. of water saturated with ethyl acetate containing dibenzylethylenediamine (26.6 g., 0.074 mole) in a well stirred and cold water cooled reaction flask. A period of about thirty minutes is consumed for the addition of the D(—)-α-aminobenzylpenicillin solution and then the reaction is allowed to continue for another thirty minutes. Thereafter, the reaction mixture, which has a pH of about 7, is stored in a cold room (5° C.) for twelve hours, then filtered, washed twice with 50 ml. portions of water, resuspended in about 100 ml. of cold water, again filtered, washed with 25 ml. of cold water and dried at room temperature for twenty-four hours to afford N,N'-dibenzylethylenediamine bis[D(—)-α-aminobenzylpenicillin]trihydrate, (55 g., 80% yield), M.P. 165–7° C. (decomp.).

Analysis.—For $C_{48}H_{58}N_8O_{11}S_2 \cdot 3H_2O$ (percent): C, 58.0; H, 6.5; N, 11.28. Found (percent): C, 57.6; H, 6.21; N, 10.92.

The above-prepared penicillin product has an infrared peak at $5.63\mu$; a Karl Fischer water analysis of 6.3%; a purity and potency which is 100% of theory; and has a crystalline structure which is substantially tabular in form with an average particle size of about 2 to about 30 microns, with about 60% of said particles in the range of 10 to 30 microns, when measured by the photomicrographic procedure.

What is claimed is:

1. A process for the preparation of N,N'-dibenzylethylenediamine bis[D(—) - α - aminobenzylpenicillin]trihydrate which comprises:
   (I) slowly admixing a solution comprised of (a) about 1.4 to about 1.8 parts of a miscible mixture of water and about six to about eight percent ethyl acetate and (b) about 1 part of equilmolar amounts of D(—)-α-aminobenzylpenicillin and triethylamine.
   (II) with about double the volume of a solution comprised of (a) a miscible mixture of water and about six to about eight percent ethyl acetate and (b) an amount of an acid salt of dibenzylethylenediamine which is about one-half the molar amount of D(—)-α-aminobenzylpenicillin employed, and
   (III) conducting said admixture at a temperature below about 10° C.

2. A process as described in claim 1 wherein the acid salt of dibenzylethylenediamine employed is the diacetate.

3. A process as described in claim 1 wherein the acid salt of dibenzylethylenediamine employed is the diacetate and the admixture is completed over a period of about one-quarter to about one hour.

4. A process for the preparation of N,N'-dibenzylethylenediamine bis [D(—) - α - aminobenzylpenicillin] trihydrate which comprises:
   (I) admixing a filtered solution comprised of (a) about 1.65 parts of water saturated with ethyl acetate and (b) about 1 part of equimolar amounts of D(—)-α-aminobenzylpenicillin and triethylamine,
   (II) with about double the volume of a filtered solution comprised of (a) water saturated with ethyl acetate and (b) an amount of dibenzylethylenediamine diacetate which is up to about ten percent in excess of one-half the molar amount of D(—)-α-aminobenzylpenicillin employed, and
   (III) conducting said admixture at a temperature below about 10° C. over a period of about one-half to about one hour.

5. A process as described in claim 4 wherein the admixture is then retained at about 5° C. for a period of about eight to about sixteen hours; then filtered and the collected solid washed with water; the collected solid resuspended in water; and the resulting suspension, filtered, and the solid product water washed and dried.

References Cited

UNITED STATES PATENTS 2,985,648  5/1961  Doyle et al. _____ 260—239.1
3,157,640  11/1964  Johnson et al. _____ 260—239.1

NICHOLAS S. RIZZO, Primary Examiner